(12) United States Patent
Wang et al.

(10) Patent No.: US 9,392,156 B2
(45) Date of Patent: Jul. 12, 2016

(54) EXTENSION FLASH MODULE AND CAMERA SYSTEM USING THE SAME

(71) Applicant: EOSMEM CORPORATION, Taipei (TW)

(72) Inventors: Hung-I Wang, Zhubei (TW); Rong-Jie Tu, Zhubei (TW)

(73) Assignee: EOSMEM CORPORATION, Taipei (TW)

( * ) Notice: Subject to any disclaimer, the term of this patent is extended or adjusted under 35 U.S.C. 154(b) by 0 days.

(21) Appl. No.: 14/838,908

(22) Filed: Aug. 28, 2015

(65) Prior Publication Data

US 2016/0142601 A1 May 19, 2016

(30) Foreign Application Priority Data

Nov. 19, 2014 (TW) ............................ 103140181 A

(51) Int. Cl.
| | |
|---|---|
| *H04B 1/06* | (2006.01) |
| *H04N 5/225* | (2006.01) |
| *H04M 1/725* | (2006.01) |
| *H04N 5/235* | (2006.01) |
| *H02M 3/04* | (2006.01) |
| *H02M 5/04* | (2006.01) |

(52) U.S. Cl.
CPC .............. *H04N 5/2256* (2013.01); *H02M 3/04* (2013.01); *H02M 5/04* (2013.01); *H04M 1/72527* (2013.01); *H04N 5/2353* (2013.01)

(58) Field of Classification Search
CPC ........................... H04M 1/0264; H04N 5/2256
USPC ................. 455/66.1, 575.1, 556.1, 90.3, 344; 348/371, 370
See application file for complete search history.

(56) References Cited

U.S. PATENT DOCUMENTS

| | | | | |
|---|---|---|---|---|
| 7,386,282 | B2 * | 6/2008 | Kim ..................... | H01Q 1/243 455/90.3 |
| 7,782,375 | B2 * | 8/2010 | Chambers ............. | H04N 7/142 348/239 |
| 8,010,154 | B2 * | 8/2011 | Chambers ........... | H04M 1/0264 455/556.1 |
| 8,478,366 | B2 * | 7/2013 | Shin .................... | H04M 1/0241 455/556.1 |
| 9,124,793 | B2 * | 9/2015 | Sheu .................... | H04N 5/2259 |
| 2005/0014527 | A1 * | 1/2005 | Chambers ........... | H04M 1/0264 455/556.1 |
| 2006/0014563 | A1 * | 1/2006 | Cheng ................ | H04M 1/0254 455/557 |

\* cited by examiner

*Primary Examiner* — Sonny Trinh

(74) *Attorney, Agent, or Firm* — Muncy, Geissler, Olds & Lowe, P.C.

(57) ABSTRACT

An extension flash module is provided in the present invention. The extension flash module adopts xenon flash light and is for attaching on the headphone jack of a mobile device. When the extension flash module operates, the voltage output from the headphone connector is boosted to provide a high voltage to the extension flash module. When the high voltage is charged to a rate voltage, the extension flash module sends a charging complete signal to the mobile device through the microphone terminal of the headphone connector. When shutter instruction is performed, the mobile device triggers the extension flash module to flash.

18 Claims, 8 Drawing Sheets

EXTENSION FLASH MODULE AND CAMERA SYSTEM USING THE SAME

This application claims priority of Application No. 103140181 filed in Taiwan, R.O.C. on 19 Nov. 2014 under 35 U.S.C. §119; the entire contents of all of which are hereby incorporated by reference.

BACKGROUND OF THE INVENTION

1. Field of the Invention

The present invention relates in general to a photoflash technology, and more particularly to an extension flash module and a camera system using the same.

2. Related Art

Due to the popularity of mobile devices, such as the mobile phone, tablet computer, and the convenience of the Internet community connection, further, due to the advance of the built-in camera in the mobile device, more and more users take pictures through their mobile device and upload those pictures to the Internet.

The photoflash is a key accessory of photography, especially in the scenes at close range, such as the insect whose distance is below 1 cm, the flash is particularly important. In shooting, when the lens is closer to the object, the depth of field is shallower, the shooting subject would be partially clear, the scene would be incomplete. Although, to stop down the aperture would let the image clearer, the amount of entering light would reduced. In handheld shooting, the image tremor would happen. The photoflash is the best solution for those problems.

However, because of the innate size and thickness of the mobile phone or the tablet computer, the quality of the camera module and the optical mechanism are limited. The camera module in the mobile phone or the tablet computer only adopts one or two LED fill light to be served as the photoflash. The poor photoflash greatly affects the quality of photograph.

SUMMARY OF THE INVENTION

It is therefore an objective of the present invention to provide an extension flash module, wherein the headphone jack of the mobile device is adopted for plugging a high quality flash to increase the quality of photograph.

Another objective of the present invention is to provide an extension flash module, wherein the USB receptacle of the mobile device is adopted for plugging a high quality flash to increase the quality of photograph.

In view of this, the present invention provides an extension flash module, adapted for a mobile device, wherein the mobile device includes a headphone jack. The extension flash module includes a headphone connector, a high-voltage conversion circuit, a xenon lamp and a voltage detecting/reporting circuit. The headphone connector includes a common voltage terminal, a first channel terminal, a second channel terminal and a microphone terminal. When the extension flash module is operated, the headphone connector is plugged into the headphone jack. The high-voltage conversion circuit includes a first input terminal, a second input terminal and an output terminal. The first input terminal of the high-voltage conversion circuit is coupled to the first channel terminal of the headphone connector, and the second input terminal of the high-voltage conversion circuit is selectively coupled to the second channel terminal or the common voltage terminal of the headphone connector, wherein the high-voltage conversion circuit is used for outputting a high voltage. The xenon lamp is coupled to the output terminal of the high-voltage conversion circuit. The voltage detecting/reporting circuit includes an input terminal and an output terminal. The input terminal of the voltage detecting/reporting circuit is coupled to the output terminal of the high-voltage conversion circuit, and the output terminal of the voltage detecting/reporting circuit is coupled to the microphone terminal.

When a user plugs the extension flash module into the headphone jack of the mobile device, and a specific application software is performed, the headphone jack outputs a power voltage and the first channel terminal receives the power voltage. When the high voltage reaches a specific voltage, the voltage detecting/reporting circuit outputs a charging complete signal to the microphone terminal of the headphone connector. When user performs a shutter instruction through the mobile device, the mobile device triggers the extension flash module to flash.

The present invention further provides a camera system. The camera system includes a mobile device and an extension flash module. The mobile device has a headphone jack. The extension flash module includes a headphone connector, a high-voltage conversion circuit, a xenon lamp and a voltage detecting/reporting circuit. The headphone connector includes a common voltage terminal, a first channel terminal, a second channel terminal and a microphone terminal. When the extension flash module is operated, the headphone connector is plugged into the headphone jack. The high-voltage conversion circuit includes a first input terminal, a second input terminal and an output terminal. The first input terminal of the high-voltage conversion circuit is coupled to the first channel terminal of the headphone connector, and the second input terminal of the high-voltage conversion circuit is selectively coupled to the second channel terminal or the common voltage terminal of the headphone connector, wherein the high-voltage conversion circuit is used for outputting a high voltage. The xenon lamp is coupled to the output terminal of the high-voltage conversion circuit. The voltage detecting/reporting circuit includes an input terminal and an output terminal. The input terminal of the voltage detecting/reporting circuit is coupled to the output terminal of the high-voltage conversion circuit, and the output terminal of the voltage detecting/reporting circuit is coupled to the microphone terminal.

When a user plugs the extension flash module into the headphone jack of the mobile device, and a specific application software is performed, the headphone jack outputs a power voltage and the first channel terminal receives the power voltage. When the high voltage reaches a specific voltage, the voltage detecting/reporting circuit outputs a charging complete signal to the microphone terminal of the headphone connector. When user performs a shutter instruction through the mobile device, the mobile device triggers the extension flash module to flash.

In the extension flash module and the camera system in accordance with a preferred embodiment of the present invention, when a user plugs the extension flash module into the headphone jack of the mobile device, and the specific application software is performed, a first channel of the headphone jack outputs an AC sinusoidal signal, and a second channel of the headphone jack outputs an inversion AC sinusoidal signal, wherein the phase difference between the AC sinusoidal signal and the inversion AC sinusoidal signal is 180 degrees. In addition, in another preferred embodiment, the high-voltage conversion circuit includes an AC to AC boost converter and a high-voltage boost converter. The AC to AC boost converter includes an input terminal, a common voltage terminal and an output terminal. The input terminal of the AC to AC boost converter is coupled to the first channel terminal of the headphone connector, the common voltage terminal of the AC to AC boost converter is coupled to the second channel terminal of the headphone connector, and the output terminal of the AC to AC boost converter outputs an AC boost voltage. The high-voltage boost converter includes an input terminal and an output terminal. The input terminal of the high-voltage boost converter is coupled to the output terminal of the AC to AC boost converter to receive the AC boost voltage, and the output terminal of the high-voltage boost converter outputs the high voltage.

In the extension flash module and the camera system in accordance with a preferred embodiment of the present invention, the first channel of the headphone jack of the mobile device outputs a positive DC voltage, and the second channel of the headphone jack of the mobile device outputs a negative DC voltage. The high-voltage conversion circuit includes a DC to DC boost converter and a high-voltage boost converter. The DC to DC boost converter includes an input terminal, a common voltage terminal and an output terminal. The input terminal of the DC to DC boost converter is coupled to the first channel terminal of the headphone connector, the common voltage terminal of the DC to DC boost converter is coupled to the second channel terminal of the headphone connector, and the output terminal of the DC to DC boost converter outputs a boost voltage. The high-voltage boost converter includes an input terminal and an output terminal. The input terminal of the high-voltage boost converter is coupled to the output terminal of the DC to DC boost converter to receive the boost voltage, and the output terminal of the high-voltage boost converter outputs the high voltage.

The present invention further provides an extension flash module, adapted for a mobile device, wherein the mobile device includes a universal serial bus (USB) receptacle. The extension flash module includes a USB connector, a high-voltage conversion circuit, a xenon lamp, a voltage detecting/reporting circuit and a USB control circuit. The USB connector includes a common voltage terminal, a positive data terminal, a negative data terminal and a power voltage terminal. When the extension flash module is operated, the USB connector is plugged into the USB receptacle. The high-voltage conversion circuit includes a first input terminal, a second input terminal and an output terminal. The first input terminal of the high-voltage conversion circuit is coupled to the power voltage terminal of the USB connector, and the second input terminal of the high-voltage conversion circuit is coupled to the common voltage terminal of the USB connector, wherein the high-voltage conversion circuit is used for outputting a high voltage. The xenon lamp is coupled to the output terminal of the high-voltage conversion circuit. The voltage detecting/reporting circuit includes an input terminal and an output terminal. The input terminal of the voltage detecting/reporting circuit is coupled to the output terminal of the high-voltage conversion circuit. The USB control circuit includes a positive I/O terminal, a negative I/O terminal and a report data terminal. The report data terminal of the USB control circuit is coupled to the output terminal of the voltage detecting/reporting circuit, positive I/O terminal of the USB control circuit is coupled to the positive data terminal of the USB connector, and the negative I/O terminal of the USB control circuit is coupled to the negative data terminal of the USB connector.

When a user plugs the extension flash module into the USB receptacle of the mobile device, and a specific application software is performed, the USB receptacle outputs a power voltage. When the high voltage reaches a specific voltage, the voltage detecting/reporting circuit outputs a charging complete signal to the report data terminal of the USB control circuit, and the USB control circuit reports a charging complete instruction to the mobile device through the positive I/O terminal and the negative I/O terminal of the USB control circuit. When user performs a shutter instruction through the mobile device, the mobile device triggers the extension flash module to flash through the USB receptacle.

The present invention further provides a camera system. The camera system includes a mobile device and an extension flash module. The mobile device includes a universal serial bus (USB) receptacle. The extension flash module includes a USB connector, a high-voltage conversion circuit, a xenon lamp, a voltage detecting/reporting circuit and a USB control circuit. The USB connector includes a common voltage terminal, a positive data terminal, a negative data terminal and a power voltage terminal. When the extension flash module is operated, the USB connector is plugged into the USB receptacle. The high-voltage conversion circuit includes a first input terminal, a second input terminal and an output terminal. The first input terminal of the high-voltage conversion circuit is coupled to the power voltage terminal of the USB connector, and the second input terminal of the high-voltage conversion circuit is coupled to the common voltage terminal of the USB connector, wherein the high-voltage conversion circuit is used for outputting a high voltage. The xenon lamp is coupled to the output terminal of the high-voltage conversion circuit. The voltage detecting/reporting circuit includes an input terminal and an output terminal. The input terminal of the voltage detecting/reporting circuit is coupled to the output terminal of the high-voltage conversion circuit. The USB control circuit includes a positive I/O terminal, a negative I/O terminal and a report data terminal. The report data terminal of the USB control circuit is coupled to the output terminal of the voltage detecting/reporting circuit, positive I/O terminal of the USB control circuit is coupled to the positive data terminal of the USB connector, and the negative I/O terminal of the USB control circuit is coupled to the negative data terminal of the USB connector.

When a user plugs the extension flash module into the USB receptacle of the mobile device, and a specific application software is performed, the USB receptacle outputs a power voltage. When the high voltage reaches a specific voltage, the voltage detecting/reporting circuit outputs a charging complete signal to the report data terminal of the USB control circuit, and the USB control circuit reports a charging complete instruction to the mobile device through the positive I/O terminal and the negative I/O terminal of the USB control circuit. When user performs a shutter instruction through the mobile device, the mobile device triggers the extension flash module to flash through the USB receptacle.

The spirit of the present invention is to provide an extension flash module for plugging into the headphone jack or the USB receptacle of mobile device. Further, by using the specific application software of the mobile device, to control headphone jack or the USB receptacle to output a power voltage, the extension flash module can be charged to a high voltage. When user uses the extension flash module, the mobile device would control the extension flash module through the headphone jack or the USB receptacle. Therefore, the image photographed by the mobile device would become more clear.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
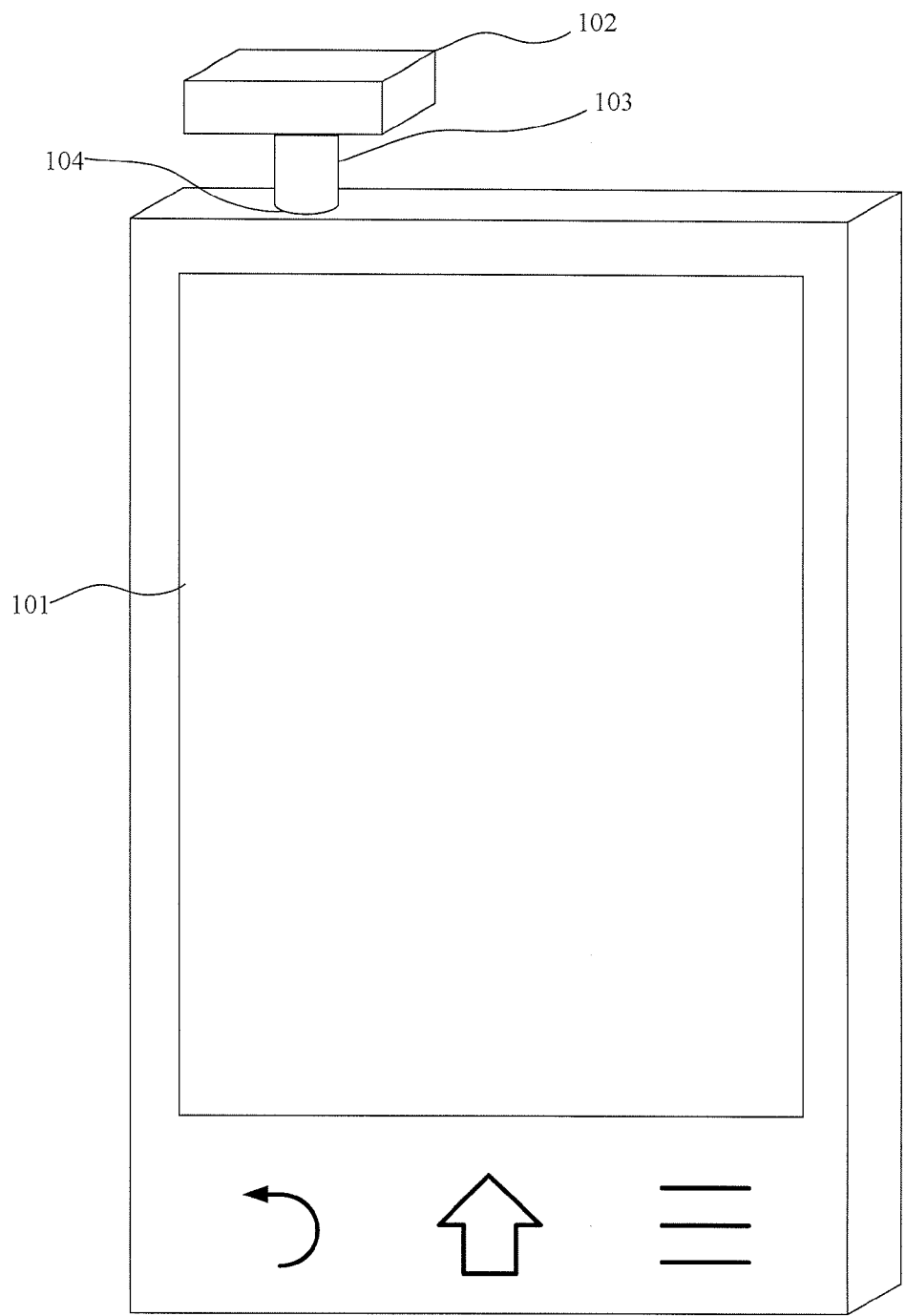
FIG. 1 illustrates a drawing depicting a camera system according to a preferred embodiment of the present invention.

FIG. 1 illustrates a drawing depicting a camera system according to a preferred embodiment of the present invention. Referring to FIG. 1, the camera system includes a mobile device 101 and an extension flash module 102. In this embodiment, the extension flash module 102 includes a headphone connector 103, and the mobile device 101 includes a headphone jack 104. The mobile device 101 may be a smart phone, tablet computer or a phablet. Since a built-in flashlight of a smart phone is generally implemented by one or more white LED(s). The white LED only can be served as an assistant exposure light. Its photograph is not as good as a photograph using a normal flash light. In addition, some tablet computer did not even have LED fill light. Therefore, in this embodiment, the extension flash module 102 is adopted for compensating those disadvantages.

Figure 2:
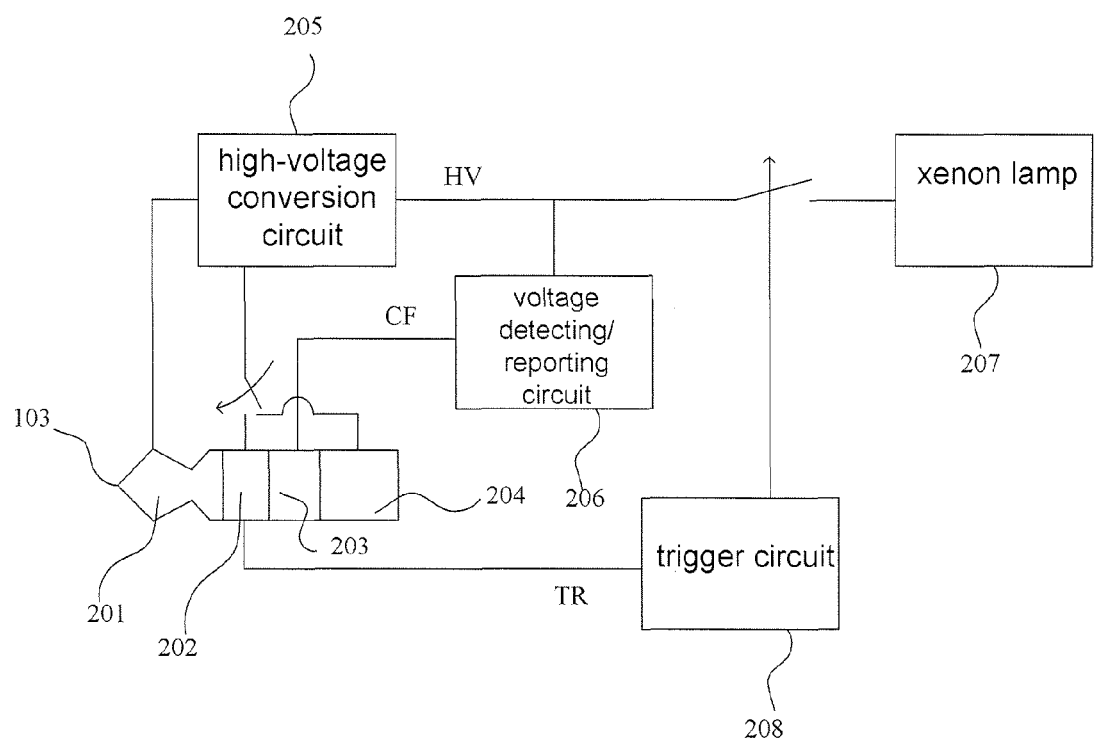
FIG. 2 illustrates a circuit block diagram of an extension flash module according to a preferred embodiment of the present invention.

FIG. 2 illustrates a circuit block diagram of an extension flash module according to a preferred embodiment of the present invention. Referring to FIG. 2, the extension flash module includes a headphone connector 103, a high-voltage conversion circuit 205, a voltage detecting/reporting circuit 206, a xenon lamp 207 and a trigger circuit 208. Further, the headphone connector 103 includes four terminals, which respectively are a left channel terminal 201, a right channel terminal 202, a microphone terminal 203 and a ground terminal 204. When the headphone connector 103 is plugged into the mobile device, the left channel terminal 201, the right channel terminal 202, the microphone terminal 203 and the ground terminal 204 would be correspondingly coupled to the left channel circuit, the right channel circuit, the microphone circuit and the ground of the mobile device 101. The high-voltage conversion circuit 205 in this embodiment has two input terminals, which are respectively coupled to the left channel terminal 201 and the right channel terminal 202, wherein the second input terminal of the high-voltage conversion circuit 205 is selectively coupled to the right channel terminal 202 or the ground terminal 204 through a switch. It would be described in the following embodiment.

In this embodiment, it is assumed that a user performs a specific application at the mobile device 101, and plugs the extension flash module into the headphone jack of the mobile device 101. In this embodiment, it is assumed that the high-voltage conversion circuit 205 is driven by an AC power. At this time, the left channel of the headphone jack of the mobile device 101 outputs a 1.4V sinusoidal signal, and the right channel of the headphone jack of the mobile device 101 also outputs a 1.4V sinusoidal signal. However, the left channel sinusoidal signal and the right channel sinusoidal are out of phase, that is to say, the phase difference between two sinusoidal signals is 180 degrees. At this time, the received voltage between the two input terminals of the high-voltage conversion circuit 205 is substantially 2.8V sinusoidal wave. The high-voltage conversion circuit 205 performs a voltage step-up to the 2.8V sinusoidal wave to obtain the high voltage HV of several thousand volts required by the xenon lamp 207.

In another embodiment, it is assumed that the high-voltage conversion circuit is driven by a DC voltage. At this time, the left channel of the headphone jack of the mobile device 101 outputs a positive 1.4V DC voltage, and the right channel of the headphone jack of the mobile device 101 outputs a negative 1.4V DC voltage. Meanwhile, the received voltage between the two input terminals of the high-voltage conversion circuit 205 is substantially 2.8V DC voltage. The high-voltage conversion circuit 205 performs a voltage step-up to the 2.8V DC voltage to obtain the high voltage HV of several thousand volts required by the xenon lamp 207.

Next, when the voltage detecting/reporting circuit 206 detects that the high voltage HV reaches a rate voltage, which means the xenon lamp 207 can performs the photoflash, the voltage detecting/reporting circuit 206 outputs a charging complete signal through the microphone terminal 203 to report it to the mobile device 101. The specific application software performed by the mobile device 101 would monitor its microphone circuit to determine whether the high voltage HV reaches the rate voltage or not. After the voltage detecting/reporting circuit 206 reports the charging complete signal CF, the second input terminal of the high-voltage conversion circuit 205 is coupled to the ground terminal 204. Since the high voltage HV is charged to the rate voltage, the requirement of the input voltage becomes lower, thus, the input voltage of the high-voltage conversion circuit 205 can be maintained at 1.4 VAC (or 1.4 VDC).

When a user operates the mobile device 101 to take picture, the mobile device 101 would send a trigger signal TR through the right channel of the headphone jack. When the trigger circuit 208 receives the trigger signal TR, the trigger circuit 208 controls the extension flash module to conduct the high voltage HV output by the high-voltage conversion circuit 205 to the xenon lamp 207 to perform photoflash. In the meantime, the mobile device 101 performs photographing.

Figure 3:
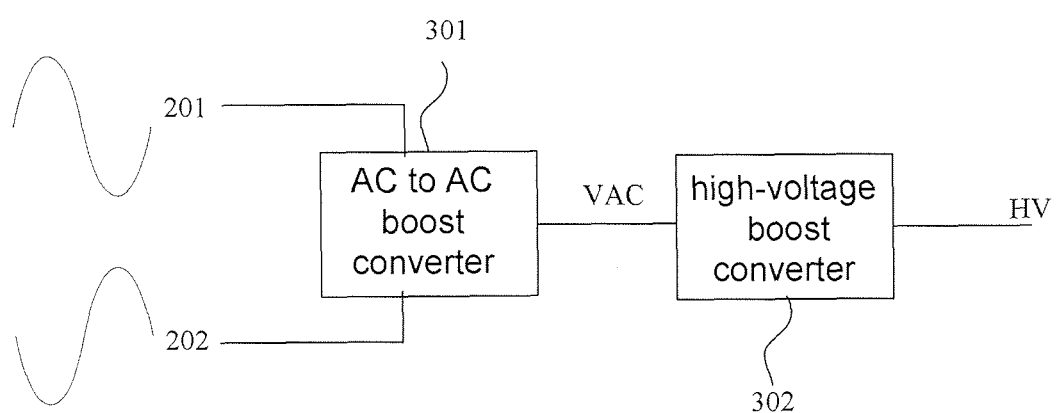
FIG. 3 illustrates a circuit block diagram of an extension flash module according to a preferred embodiment of the present invention.

FIG. 3 illustrates a circuit block diagram of an extension flash module according to a preferred embodiment of the present invention. Referring to FIG. 3, the high-voltage conversion circuit 205 includes an AC to AC boost converter 301 and a high-voltage boost converter 302. The input terminal of the AC to AC boost converter 301 is coupled to the left channel terminal 201 of the headphone connector. The common voltage terminal of the AC to AC boost converter 301 is coupled to the right channel terminal 202. The AC to AC boost converter 301 outputs a AC boost voltage VAC. Since the AC boost voltage is about several hundred volts, and it is still insufficient to drive the xenon lamp 207, to further boost the AC boost voltage is required. The input terminal of the high-voltage boost converter 302 is coupled to the output terminal of the AC to AC boost converter 301 to receive the AC boost voltage VAC. The output terminal of the high-voltage boost converter 302 outputs the high voltage HV of several thousand volts.

In the abovementioned embodiment, since the output from the left and right channels is AC power, the AC to AC boost converter can be adopted to convert the output of the left and right channels. In the following embodiment, a high-voltage conversion circuit 205 can be used by receiving DC voltage and AC voltage.

Figure 4:
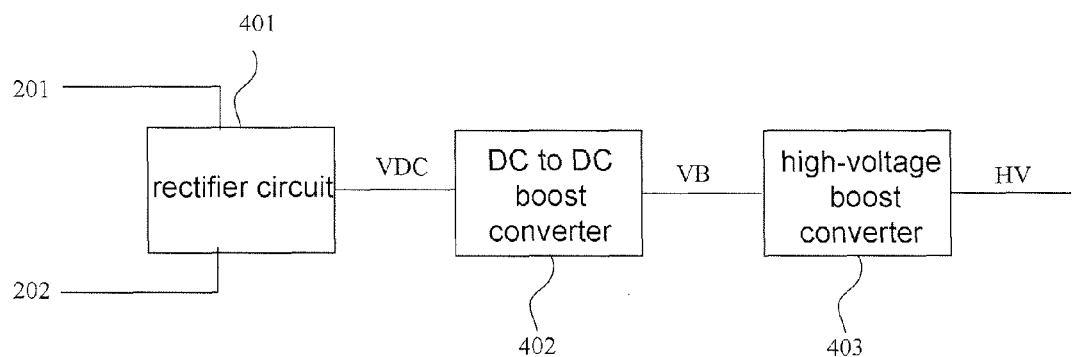
FIG. 4 illustrates a circuit block diagram of a high-voltage conversion circuit 205 of an extension flash module according to a preferred embodiment of the present invention.

FIG. 4 illustrates a circuit block diagram of a high-voltage conversion circuit 205 of an extension flash module according to a preferred embodiment of the present invention. Referring to FIG. 4, the high-voltage conversion circuit 205 includes a rectifier circuit 401, a DC to DC boost converter 402 and a high-voltage boost converter 403. The rectifier circuit 401 may be a bridge rectifier, a full wave rectifier or a half wave rectifier. The first input terminal and the second input terminal of the rectifier circuit 401 are respectively coupled to the left channel terminal 201 and the right channel terminal 202. A DC voltage VDC is rectified between the output terminal and the common voltage terminal of the rectifier circuit 401. The input terminal of the DC to DC boost converter 402 is coupled to the output terminal of the rectifier circuit 401, and the common voltage terminal of the DC to DC boost converter 402 is coupled to the common voltage terminal of the rectifier circuit 401. The DC to DC boost converter 402 converts the DC voltage VDC into a boost voltage VB of several hundred volts. However, the boost voltage VB is insufficient to drive the xenon lamp 207. Thus, a high-voltage boost converter 403 is necessary to be coupled to the DC to DC boost converter 402. The input terminal of the high-voltage boost converter 403 is coupled to the output terminal of the DC to DC boost converter 402 to receive the boost voltage VB. The output terminal of the high-voltage boost converter 403 outputs the high voltage HV of several thousand volts.

According to the abovementioned embodiment, since there is a rectifier circuit in this embodiment. Either a DC voltage is input, or an AC voltage is input, a DC voltage VDC is rectified. Thus, this embodiment can be adapted for the AC power input between the left and right channels and the positive and negative DC voltage input between the left and right channels. For example, it is assumed that the left channel outputs a positive 1.4V DC voltage, and the right channel outputs a negative 1.4V DC voltage, 2 (deducting the diodes voltage drop) to 2.8V DC voltage can be obtained after rectification.

The abovementioned embodiment mainly adopts the AC power output by the mobile device. The following embodiment takes the DC voltage output by the mobile device as example.

Figure 5:
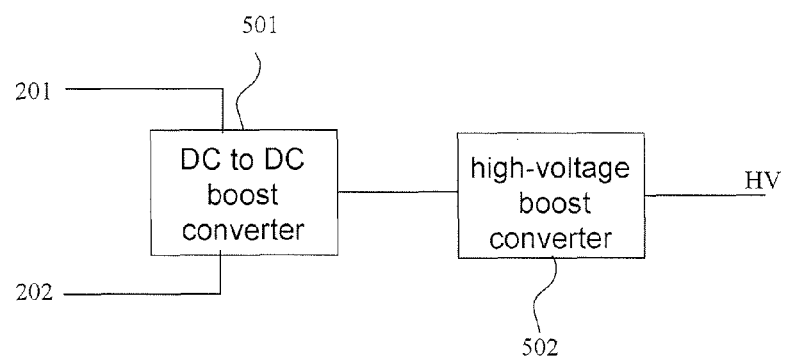
FIG. 5 illustrates a circuit block diagram of a high-voltage conversion circuit 205 of an extension flash module according to a preferred embodiment of the present invention.

FIG. 5 illustrates a circuit block diagram of a high-voltage conversion circuit 205 of an extension flash module according to a preferred embodiment of the present invention. Referring to FIG. 5, the high-voltage conversion circuit 205 includes a DC to DC boost converter 501 and a high-voltage boost converter 502. Since this embodiment adopts DC voltage driving, the rectifier circuit 401 can be omitted in comparison with the circuit in FIG. 4. Because the operation of the DC to DC boost converter 501 is the same as the operation of the DC to DC boost converter 402, and the operation of the high-voltage boost converter 502 is the same as the operation of the high-voltage boost converter 403, the detail description is omitted.

Figure 6:
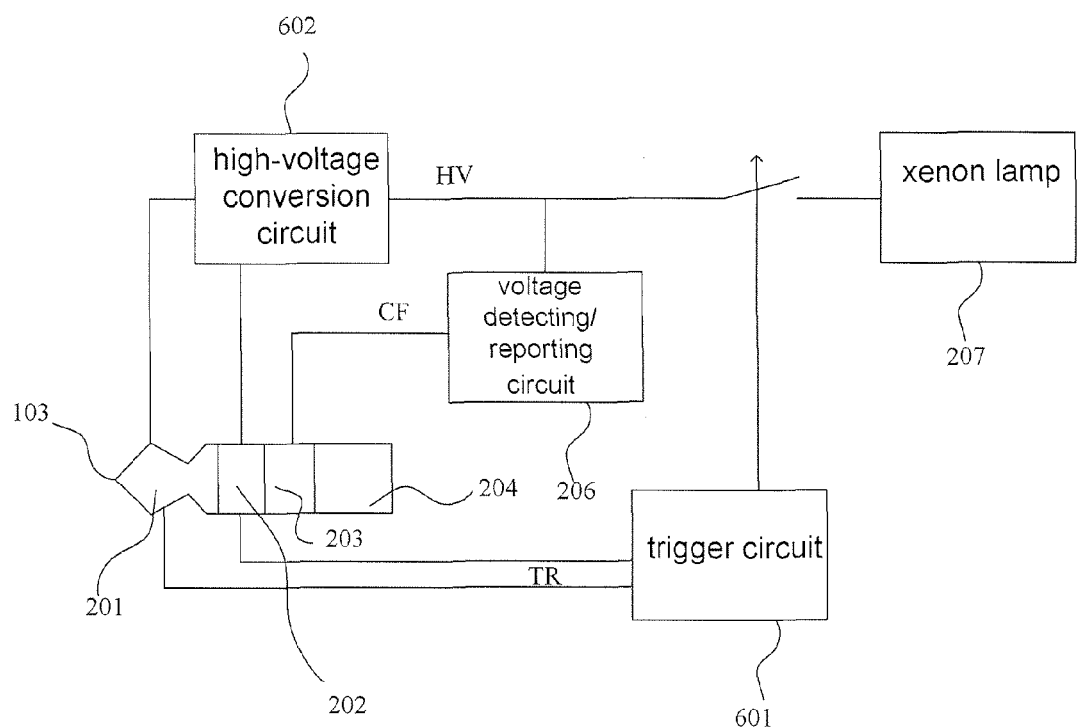
FIG. 6 illustrates a circuit block diagram of an extension flash module according to a preferred embodiment of the present invention.

FIG. 6 illustrates a circuit block diagram of an extension flash module according to a preferred embodiment of the present invention. Referring to FIG. 2 and FIG. 6, the difference between this embodiment and the embodiment in FIG. 2 is the trigger circuit 601 is coupled to the left channel terminal and the right channel terminal. Moreover, the high-voltage conversion circuit 602 is only coupled to the right channel terminal. Thus, the trigger signal is a specific wave output by the left channel and the right channel, and it requires to decode by the trigger circuit 601. Therefore, the present invention is not limited to trigger the photoflash by one channel.

Similarly, in the abovementioned embodiment, the left channel outputs a positive voltage, and the right channel outputs a negative voltage. People having ordinary skill in the art should know that either the positive voltage output by the left channel and the negative voltage output by the right channel or the positive voltage output by the right channel and the negative voltage output by the left channel can be changed by design. Furthermore, the headphone jack and the headphone connector in the abovementioned embodiment adopt the standard circuit released by Computer & Communications Industry Association to serve as an example. People having ordinary skill in the art should know that the headphone jack and the headphone connector released by Open Mobile Terminal Platform also can be adopted by the present invention. The difference between two standards is the ground terminal and the microphone terminal. The present invention is not limited thereto.

Figure 7:
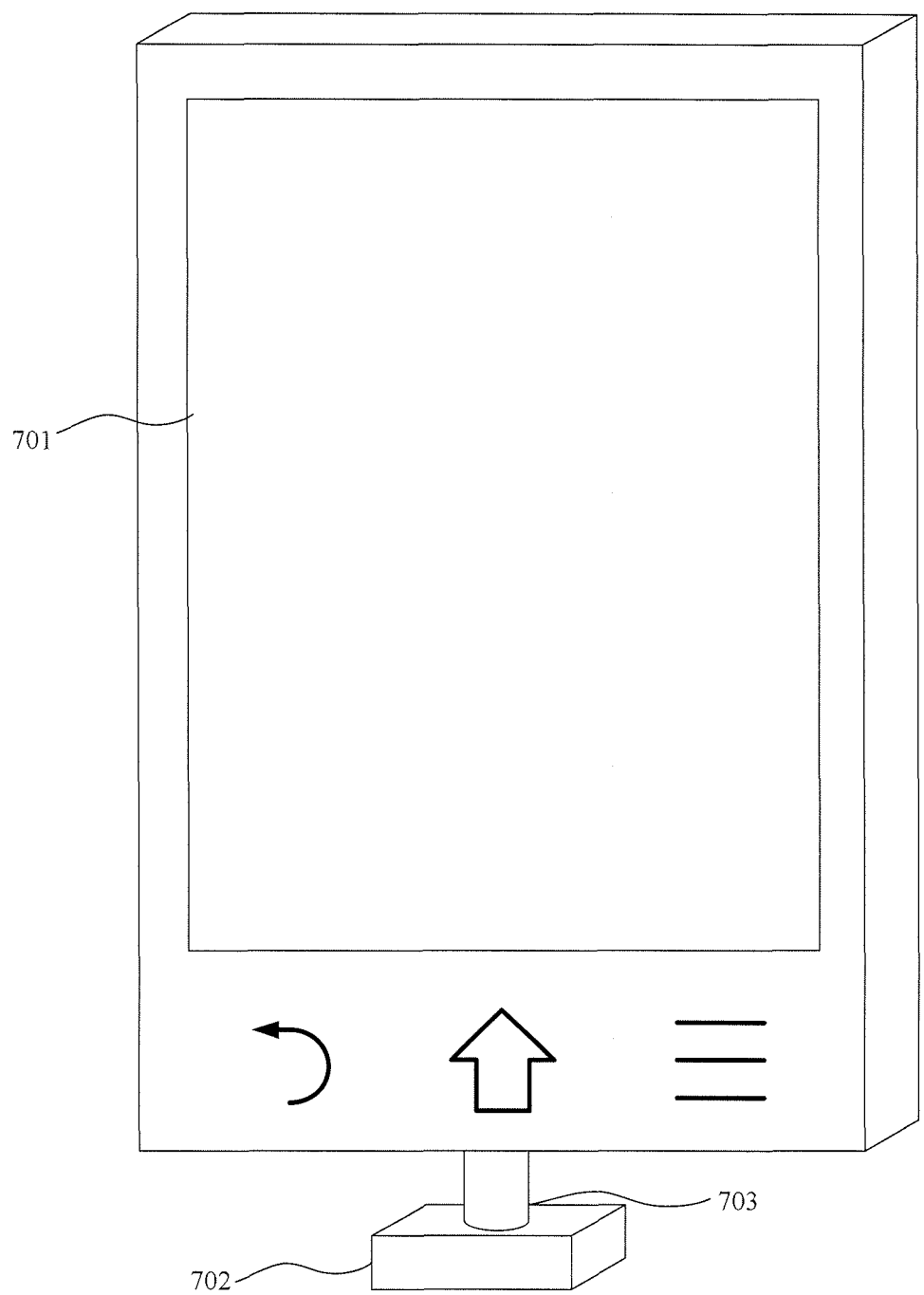
FIG. 7 illustrates a drawing depicting a camera system according to a preferred embodiment of the present invention.

FIG. 7 illustrates a drawing depicting a camera system according to a preferred embodiment of the present invention. Referring to FIG. 7, the camera system includes a mobile device 701 and an extension flash module 702. In this embodiment, the extension flash module 702 has a USB connector 703, and the mobile device 701 has a USB receptacle. Similarly, mobile device 701 may be a smart phone, tablet computer or a phablet. Since a built-in flashlight of a smart phone is generally implemented by one or more white LED (s). The white LED only can be served as an assistant exposure light. Its photograph is not as good as a photograph using a normal flash light. In addition, some tablet computer did not even have LED fill light. Therefore, in this embodiment, the extension flash module 702 is adopted for compensating those disadvantages. Moreover, in this embodiment, the USB connector 703 adopts a connector matching with the USB receptacle of the mobile device 701. For example, the USB receptacle of the mobile device 701 adopts the micro USB receptacle, the connector 703 adopts the micro USB connector. When the USB receptacle of the mobile device 701 adopts mini USB receptacle, the connector 703 adopts the mini USB connector. The present invention is not limited thereto.

Figure 8:
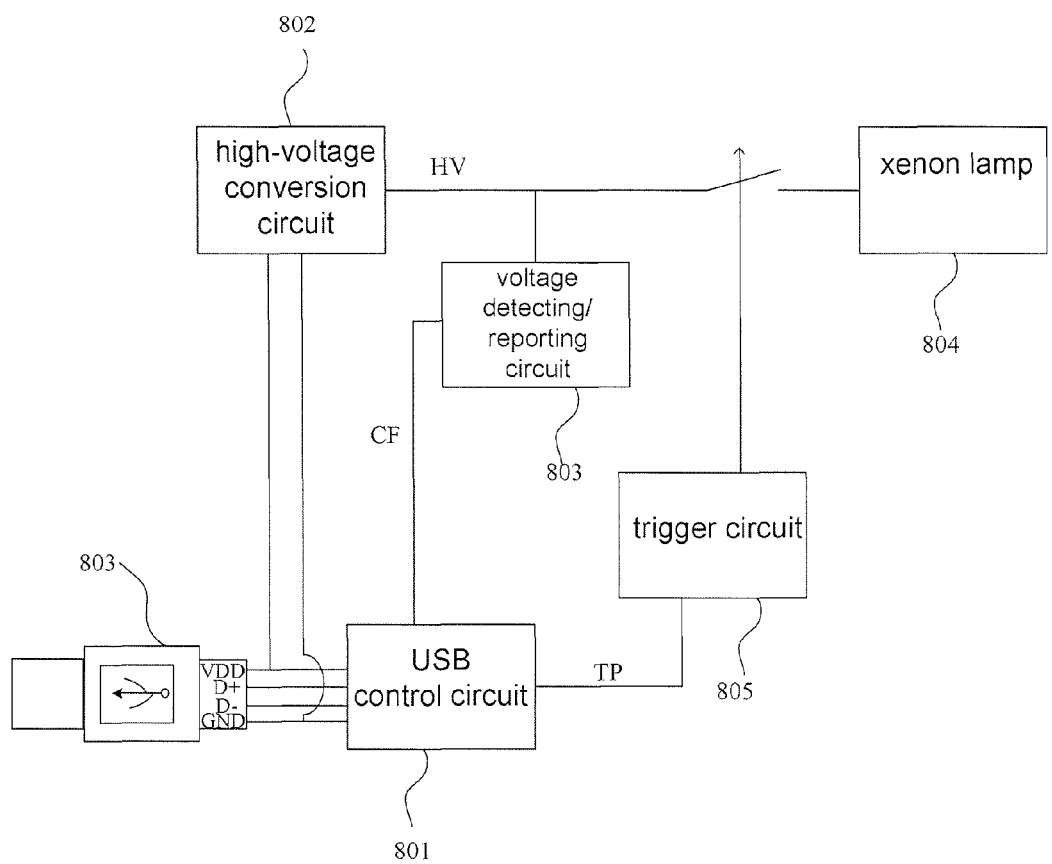
FIG. 8 illustrates a circuit block diagram of an extension flash module according to a preferred embodiment of the present invention.

FIG. 8 illustrates a circuit block diagram of an extension flash module according to a preferred embodiment of the present invention. Referring to FIG. 8, the extension flash module includes a USB connector 703, a USB control circuit 801, a high-voltage conversion circuit 802, the voltage detecting/reporting circuit 803, a xenon lamp 804 and a trigger circuit 805. Moreover, the USB connector 703 has four terminals, which are power voltage terminal VDD, a common voltage terminal GND, a positive data terminal D+ and a negative data terminal D−. When the USB connector 703 plugs into the mobile device 701, the power voltage terminal VDD, the common voltage terminal GND, the positive data terminal D+ and the negative data terminal D− are correspondingly coupled to the power voltage terminal VDD, the common voltage terminal GND, the positive data terminal D+ and the negative data terminal D− of the USB receptacle of the mobile device 701. The high-voltage conversion circuit 802 in this embodiment has two input terminals, which are respectively coupled to the power voltage terminal VDD and the common voltage terminal GND of the USB connector 703.

In this embodiment, it is assumed that a user performs a specific application software on the mobile device 701, and plugs the extension flash module 702 to the USB receptacle of the mobile device 701. In this embodiment, the high-voltage conversion circuit 802 is driven by DC power. At this time, the power voltage terminal of the USB receptacle of the mobile device 701 outputs a 5V DC voltage, and the common voltage terminal of the USB receptacle of the mobile device 701 outputs a common voltage. The high-voltage conversion circuit 802 performs a voltage step-up to the 5V DC voltage to obtain the high voltage HV of several thousand volts required by the xenon lamp 804.

Next, when the voltage detecting/reporting circuit 803 detects that the high voltage HV reaches a rate voltage, which means the xenon lamp 804 can performs the photoflash, the voltage detecting/reporting circuit 803 outputs a charging complete signal CF to the USB control circuit 801. The USB control circuit 801 reports it to the mobile device 701 through the positive data terminal D+ and the negative data terminal of the USB connector 703. The specific application software performed by the mobile device 701 would monitor the positive data terminal D+ and the negative data terminal of the USB receptacle of the mobile device 701 to determine whether the high voltage HV reaches the rate voltage or not.

When a user operates the mobile device 701 to take picture, the mobile device 701 would send a trigger signal through positive data terminal D+ and the negative data terminal of the USB receptacle. When the USB control circuit 801 receives the trigger signal, the USB control circuit 801 outputs a trigger pulse TP to the trigger circuit 805. When the trigger circuit 805 receives the trigger pulse TP, the trigger circuit 805 controls the extension flash module to conduct the high voltage HV output by the high-voltage conversion circuit 802 to the xenon lamp 804 to perform photoflash. In the meantime, the mobile device 701 performs photographing.

Figure 9:
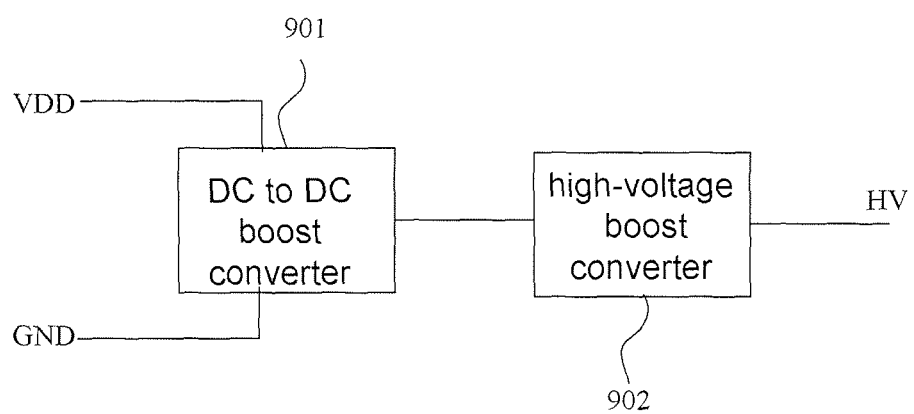
FIG. 9 illustrates a circuit block diagram of a high-voltage conversion circuit 802 of an extension flash module according to a preferred embodiment of the present invention.

FIG. 9 illustrates a circuit block diagram of a high-voltage conversion circuit 802 of an extension flash module according to a preferred embodiment of the present invention. Referring to FIG. 9, the high-voltage conversion circuit 802 includes a DC to DC boost converter 901 and a high-voltage boost converter 902. Since the circuit in this embodiment is driven by DC power, the circuit in FIG. 9 is the same as the circuit in FIG. 5. Since the operation of the DC to DC boost converter 901 is the same as the operation of the DC to DC boost converter 501 in FIG. 5, and the operation of the high-voltage boost converter 902 is the same as the operation of the high-voltage boost converter 502, the detail description is omitted.

In summary, the spirit of the present invention is to provide an extension flash module for plugging into the headphone jack of mobile device. Further, by using the specific application software of the mobile device, to control headphone jack to output a power voltage, the extension flash module can be charged to a high voltage. When user uses the extension flash module, the mobile device would control the extension flash module through the headphone jack. Therefore, the image photographed by the mobile device would become more clear. In another preferred embodiment, the extension flash module can be also plugged into the mobile device having USB port.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An extension flash module, adapted for a mobile device, wherein the mobile device comprises a headphone jack, wherein the extension flash module comprises:
    a headphone connector, comprising a common voltage terminal, a first channel terminal, a second channel terminal and a microphone terminal, wherein the headphone connector is plugged into the headphone jack when the extension flash module is operated;
    a high-voltage conversion circuit, comprising a first input terminal, a second input terminal and an output terminal, wherein the first input terminal of the high-voltage conversion circuit is coupled to the first channel terminal of the headphone connector, and the second input terminal of the high-voltage conversion circuit is selectively coupled to the second channel terminal of the headphone connector or the common voltage terminal of the headphone connector, wherein the high-voltage conversion circuit is used for outputting a high voltage;
    a xenon lamp, coupled to the output terminal of the high-voltage conversion circuit; and
    a voltage detecting/reporting circuit, comprising an input terminal and an output terminal, wherein the input terminal of the voltage detecting/reporting circuit is coupled to the output terminal of the high-voltage conversion circuit, and the output terminal of the voltage detecting/reporting circuit is coupled to the microphone terminal,
    wherein, when a user plugs the extension flash module into the headphone jack of the mobile device, and a specific application software is performed, the headphone jack outputs a power voltage and the first channel terminal receives the power voltage,
    wherein, when the high voltage reaches a specific voltage, the voltage detecting/reporting circuit outputs a charging complete signal to the microphone terminal of the headphone connector,
    wherein, when user performs a shutter instruction through the mobile device, the mobile device triggers the extension flash module to flash.

2. The extension flash module according to claim 1, wherein, when user plugs the extension flash module into the headphone jack of the mobile device, and the specific application software is performed, a first channel of the headphone jack outputs an AC sinusoidal signal, and a second channel of the headphone jack outputs an inversion AC sinusoidal signal, wherein the phase difference between the AC sinusoidal signal and the inversion AC sinusoidal signal is 180 degrees.

3. The extension flash module according to claim 1, wherein, when the mobile device receives the charging complete signal, a second channel of the headphone jack of the mobile device stops to output the inversion AC sinusoidal signal, wherein the mobile device outputs a trigger signal from the second channel of the headphone jack, wherein the extension flash module comprising:
    a trigger circuit, coupled to the second channel terminal of the headphone connector, wherein, when the trigger circuit receives the trigger signal, the trigger circuit controls a circuit between the output terminal of the high-voltage conversion circuit and the xenon lamp to trigger a flash of the extension flash module.

4. The extension flash module according to claim 1, wherein the power voltage is an AC sinusoidal voltage, and the high-voltage conversion circuit comprises:
- a rectifying circuit, comprising a first input terminal, a second input terminal, a common voltage terminal and an output terminal, wherein the first input terminal of the rectifying circuit is coupled to the first channel terminal, and the second input terminal of the rectifying circuit is coupled to the second channel terminal, wherein the rectifying circuit is for rectifying the voltages received from the first input terminal and the second input terminal of the rectifying circuit such that a DC voltage between the output terminal and the common voltage terminal can be obtained;
- a DC to DC boost converter, comprising an input terminal, a common voltage terminal and an output terminal, wherein the input terminal of the DC to DC boost converter is coupled to the output terminal of the rectifying circuit, the common voltage terminal of the DC to DC boost converter is coupled to the common voltage terminal of the rectifying circuit, and the output terminal of the DC to DC boost converter outputs a boost voltage; and
- a high-voltage boost converter, comprising an input terminal and an output terminal, wherein the input terminal of the high-voltage boost converter is coupled to the output terminal of the DC to DC boost converter to receive the boost voltage, and the output terminal of the high-voltage boost converter outputs the high voltage.

5. The extension flash module according to claim 1, wherein a first channel of the headphone jack of the mobile device outputs a positive DC voltage, and a second channel of the headphone jack of the mobile device outputs a negative DC voltage, wherein the high-voltage conversion circuit comprises:
- a DC to DC boost converter, comprising an input terminal, a common voltage terminal and an output terminal, wherein the input terminal of the DC to DC boost converter is coupled to the first channel terminal of the headphone connector, the common voltage terminal of the DC to DC boost converter is coupled to the second channel terminal of the headphone connector, and the output terminal of the DC to DC boost converter outputs a boost voltage; and
- a high-voltage boost converter, comprising an input terminal and an output terminal, wherein the input terminal of the high-voltage boost converter is coupled to the output terminal of the DC to DC boost converter to receive the boost voltage, and the output terminal of the high-voltage boost converter outputs the high voltage.

6. The extension flash module according to claim 1, wherein the power voltage is an AC sinusoidal voltage, wherein a first channel of the headphone jack of the mobile device outputs an AC sinusoidal signal, and a second channel of the headphone jack of the mobile device outputs an inversion AC sinusoidal signal, wherein the high-voltage conversion circuit comprises:
- an AC to AC boost converter, comprising an input terminal, a common voltage terminal and an output terminal, wherein the input terminal of the AC to AC boost converter is coupled to the first channel terminal of the headphone connector, the common voltage terminal of the AC to AC boost converter is coupled to the second channel terminal of the headphone connector, and the output terminal of the AC to AC boost converter outputs an AC boost voltage; and
- a high-voltage boost converter, comprising an input terminal and an output terminal, wherein the input terminal of the high-voltage boost converter is coupled to the output terminal of the AC to AC boost converter to receive the AC boost voltage, and the output terminal of the high-voltage boost converter outputs the high voltage.

7. A camera system, comprising:
a mobile device, wherein the mobile device having a headphone jack; and
an extension flash module, comprising:
- a headphone connector, comprising a common voltage terminal, a first channel terminal, a second channel terminal and a microphone terminal, wherein the headphone connector is plugged into the headphone jack when the extension flash module is operated;
- a high-voltage conversion circuit, comprising a first input terminal, a second input terminal and an output terminal, wherein the first input terminal of the high-voltage conversion circuit is coupled to the first channel terminal of the headphone connector, and the second input terminal of the high-voltage conversion circuit is selectively coupled to the second channel terminal or the common voltage terminal of the headphone connector, wherein the high-voltage conversion circuit is used for outputting a high voltage;
- a xenon lamp, coupled to the output terminal of the high-voltage conversion circuit; and
- a voltage detecting/reporting circuit, comprising an input terminal and an output terminal, wherein the input terminal of the voltage detecting/reporting circuit is coupled to the output terminal of the high-voltage conversion circuit, and the output terminal of the voltage detecting/reporting circuit is coupled to the microphone terminal, wherein, when a user plugs the extension flash module into the headphone jack of the mobile device, and a specific application software is performed, the headphone jack outputs a power voltage and the first channel terminal receives the power voltage, wherein, when the high voltage reaches a specific voltage, the voltage detecting/reporting circuit outputs a charging complete signal to the microphone terminal of the headphone connector, wherein, when user performs a shutter instruction through the mobile device, the mobile device triggers the extension flash module to flash.

8. The camera system according to claim 7, wherein, when user plugs the extension flash module into the headphone jack of the mobile device, and the specific application software is performed, a first channel of the headphone jack outputs an AC sinusoidal signal, and a second channel of the headphone jack outputs an inversion AC sinusoidal signal, wherein the phase difference between the AC sinusoidal signal and the inversion AC sinusoidal signal is 180 degrees.

9. The camera system according to claim 8, wherein, when the mobile device receives the charging complete signal, a second channel of the headphone jack of the mobile device stops to output the inversion AC sinusoidal signal, wherein the mobile device outputs a trigger signal from the second channel terminal of the headphone jack, wherein the extension flash module comprising:
- a trigger circuit, coupled to the second channel terminal of the headphone connector, wherein, when the trigger circuit receives the trigger signal, the trigger circuit controls a circuit between the output terminal of the high-voltage conversion circuit and the xenon lamp to trigger a flash of the extension flash module.

10. The camera system according to claim 7, wherein the power voltage is an AC sinusoidal voltage, and the high-voltage conversion circuit comprises:
- a rectifying circuit, comprising a first input terminal, a second input terminal, a common voltage terminal and an output terminal, wherein the first input terminal of the rectifying circuit is coupled to the first channel terminal, and the second input terminal of the rectifying circuit is coupled to the second channel terminal, wherein the rectifying circuit is for rectifying the voltages received from the first input terminal and the second input terminal of the rectifying circuit such that a DC voltage between the output terminal and the common voltage terminal can be obtained;
- a DC to DC boost converter, comprising an input terminal, a common voltage terminal and an output terminal, wherein the input terminal of the DC to DC boost converter is coupled to the output terminal of the rectifying circuit, the common voltage terminal of the DC to DC boost converter is coupled to the common voltage terminal of the rectifying circuit, and the output terminal of the DC to DC boost converter outputs a boost voltage; and
- a high-voltage boost converter, comprising an input terminal and an output terminal, wherein the input terminal of the high-voltage boost converter is coupled to the output terminal of the DC to DC boost converter to receive the boost voltage, and the output terminal of the high-voltage boost converter outputs the high voltage.

11. The camera system according to claim 7, wherein a first channel of the headphone jack of the mobile device outputs a positive DC voltage, and a second channel of the headphone jack of the mobile device outputs a negative DC voltage, wherein the high-voltage conversion circuit comprises:
- a DC to DC boost converter, comprising an input terminal, a common voltage terminal and an output terminal, wherein the input terminal of the DC to DC boost converter is coupled to the first channel terminal of the headphone connector, the common voltage terminal of the DC to DC boost converter is coupled to the second channel terminal of the headphone connector, and the output terminal of the DC to DC boost converter outputs a boost voltage; and
- a high-voltage boost converter, comprising an input terminal and an output terminal, wherein the input terminal of the high-voltage boost converter is coupled to the output terminal of the DC to DC boost converter to receive the boost voltage, and the output terminal of the high-voltage boost converter outputs the high voltage.

12. The camera system according to claim 7, wherein the power voltage is an AC sinusoidal voltage, wherein a first channel of the headphone jack of the mobile device outputs an AC sinusoidal signal, and a second channel of the headphone jack of the mobile device outputs an inversion AC sinusoidal signal, wherein the high-voltage conversion circuit comprises:
- an AC to AC boost converter, comprising an input terminal, a common voltage terminal and an output terminal, wherein the input terminal of the AC to AC boost converter is coupled to the first channel terminal of the headphone connector, the common voltage terminal of the AC to AC boost converter is coupled to the second channel terminal of the headphone connector, and the output terminal of the AC to AC boost converter outputs an AC boost voltage; and
- a high-voltage boost converter, comprising an input terminal and an output terminal, wherein the input terminal of the high-voltage boost converter is coupled to the output terminal of the AC to AC boost converter to receive the AC boost voltage, and the output terminal of the high-voltage boost converter outputs the high voltage.

13. An extension flash module, adapted for a mobile device, wherein the mobile device comprises a universal serial bus (USB) receptacle, wherein the extension flash module comprises:
- a USB connector, comprising a common voltage terminal, a positive data terminal, a negative data terminal and a power voltage terminal, wherein when the extension flash module is operated, the USB connector is plugged into the USB receptacle;
- a high-voltage conversion circuit, comprising a first input terminal, a second input terminal and an output terminal, wherein the first input terminal of the high-voltage conversion circuit is coupled to the power voltage terminal of the USB connector, and the second input terminal of the high-voltage conversion circuit is coupled to the common voltage terminal of the USB connector, wherein the high-voltage conversion circuit is used for outputting a high voltage;
- a xenon lamp, coupled to the output terminal of the high-voltage conversion circuit; and
- a voltage detecting/reporting circuit, comprising an input terminal and an output terminal, wherein the input terminal of the voltage detecting/reporting circuit is coupled to the output terminal of the high-voltage conversion circuit; and
- a USB control circuit, comprising a positive I/O (input/output) terminal, a negative I/O terminal and a report data terminal, wherein the report data terminal of the USB control circuit is coupled to the output terminal of the voltage detecting/reporting circuit, positive I/O terminal of the USB control circuit is coupled to the positive data terminal of the USB connector, and the negative I/O terminal of the USB control circuit is coupled to the negative data terminal of the USB connector, wherein, when a user plugs the extension flash module into the USB receptacle of the mobile device, and a specific application software is performed, the USB receptacle outputs a power voltage, wherein, when the high voltage reaches a specific voltage, the voltage detecting/reporting circuit outputs a charging complete signal to the report data terminal of the USB control circuit, and the USB control circuit reports a charging complete instruction to the mobile device through the positive I/O terminal and the negative I/O terminal of the USB control circuit, wherein, when user performs a shutter instruction through the mobile device, the mobile device triggers the extension flash module to flash through the USB receptacle.

14. The extension flash module according to claim 13, wherein the mobile device send a trigger signal through a positive data terminal and a negative data terminal of USB receptacle, wherein the USB control circuit comprises a trigger signal terminal, when the USB control circuit receives the trigger signal, the trigger signal terminal of the USB control circuit outputs a trigger pulse, wherein the extension flash module comprising:
- a trigger circuit, coupled to the trigger signal terminal of the USB control circuit, wherein, when the trigger circuit receives the trigger pulse, the trigger circuit controls a circuit between the output terminal of the high-voltage conversion circuit and the xenon lamp to trigger a flash of the extension flash module.

15. The extension flash module according to claim 13, wherein the high-voltage conversion circuit comprises:
- a DC to DC boost converter, comprising an input terminal, a common voltage terminal and an output terminal, wherein the input terminal of the DC to DC boost converter is coupled to the power voltage terminal of the USB connector, the common voltage terminal of the DC to DC boost converter is coupled to the common voltage terminal of the USB connector, and the output terminal of the DC to DC boost converter outputs a boost voltage; and
- a high-voltage boost converter, comprising an input terminal and an output terminal, wherein the input terminal of the high-voltage boost converter is coupled to the output terminal of the DC to DC boost converter to receive the boost voltage, and the output terminal of the high-voltage boost converter outputs the high voltage.

16. An camera system, comprising:
a mobile device, wherein the mobile device includes a universal serial bus (USB) receptacle; and
an extension flash module, comprising:
- a USB connector, comprising a common voltage terminal, a positive data terminal, a negative data terminal and a power voltage terminal, wherein when the extension flash module is operated, the USB connector is plugged into the USB receptacle;
- a high-voltage conversion circuit, comprising a first input terminal, a second input terminal and an output terminal, wherein the first input terminal of the high-voltage conversion circuit is coupled to the power voltage terminal of the USB connector, and the second input terminal of the high-voltage conversion circuit is coupled to the common voltage terminal of the USB connector, wherein the high-voltage conversion circuit is used for outputting a high voltage;
- a xenon lamp, coupled to the output terminal of the high-voltage conversion circuit; and
- a voltage detecting/reporting circuit, comprising an input terminal and an output terminal, wherein the input terminal of the voltage detecting/reporting circuit is coupled to the output terminal of the high-voltage conversion circuit; and
- a USB control circuit, comprising a positive I/O (input/output) terminal, a negative I/O terminal and a report data terminal, wherein the report data terminal of the USB control circuit is coupled to the output terminal of the voltage detecting/reporting circuit, positive I/O terminal of the USB control circuit is coupled to the positive data terminal of the USB connector, and the negative I/O terminal of the USB control circuit is coupled to the negative data terminal of the USB connector,
wherein, when a user plugs the extension flash module into the USB receptacle of the mobile device, and a specific application software is performed, the USB receptacle outputs a power voltage,
wherein, when the high voltage reaches a specific voltage, the voltage detecting/reporting circuit outputs a charging complete signal to the report data terminal of the USB control circuit, and the USB control circuit reports a charging complete instruction to the mobile device through the positive I/O terminal and the negative I/O terminal of the USB control circuit,
wherein, when user performs a shutter instruction through the mobile device, the mobile device triggers the extension flash module to flash through the USB receptacle.

17. The camera system according to claim 16, wherein the mobile device send a trigger signal through a positive data terminal and a negative data terminal of USB receptacle, wherein the USB control circuit comprises a trigger signal terminal, when the USB control circuit receives the trigger signal, the trigger signal terminal of the USB control circuit outputs a trigger pulse, wherein the extension flash module comprising:
- a trigger circuit, coupled to the trigger signal terminal of the USB control circuit, wherein, when the trigger circuit receives the trigger pulse, the trigger circuit controls a circuit between the output terminal of the high-voltage conversion circuit and the xenon lamp to trigger a flash of the extension flash module.

18. The camera system according to claim 16, wherein the high-voltage conversion circuit comprises:
- a DC to DC boost converter, comprising an input terminal, a common voltage terminal and an output terminal, wherein the input terminal of the DC to DC boost converter is coupled to the power voltage terminal of the USB connector, the common voltage terminal of the DC to DC boost converter is coupled to the common voltage terminal of the USB connector, and the output terminal of the DC to DC boost converter outputs a boost voltage; and
- a high-voltage boost converter, comprising an input terminal and an output terminal, wherein the input terminal of the high-voltage boost converter is coupled to the output terminal of the DC to DC boost converter to receive the boost voltage, and the output terminal of the high-voltage boost converter outputs the high voltage.

* * * * *